United States Patent [19]

Maubray

[11] Patent Number: 5,699,583
[45] Date of Patent: Dec. 23, 1997

[54] SCREEN WIPER BLADE HAVING A FLEXIBLE DEFLECTOR FASTENED ON THE GRIPPERS WHICH HOLD THE WIPING STRIP OF THE BLADE

[75] Inventor: Daniel Maubray, Issy les Moulineaux, France

[73] Assignee: Valeo Systemes D'Essuyage, La Verrier, France

[21] Appl. No.: 720,306

[22] Filed: Sep. 27, 1996

[30] Foreign Application Priority Data

Sep. 29, 1995 [FR] France .................. 95 11502

[51] Int. Cl.$^6$ .................. B60S 1/38
[52] U.S. Cl. .................. 15/250.201; 15/250.44
[58] Field of Search .................. 15/250.201, 250.361, 15/250.43, 250.44, 250.451, 250.452, 250.453, 250.31

[56] References Cited

U.S. PATENT DOCUMENTS 5,138,739  8/1992  Maubray .................. 15/250.201
5,206,969  5/1993  Patterson et al. .................. 15/250.201

FOREIGN PATENT DOCUMENTS

| | | |
|---|---|---|
| 419 328 | 3/1991 | European Pat. Off. . |
| 433169 | 6/1991 | European Pat. Off. .......... 15/250.201 |
| 2679186 | 1/1993 | France .................. 15/250.201 |
| 2685270 | 6/1993 | France .................. 15/205.201 |
| 2 695 606 | 3/1994 | France . |
| 2 106 775 | 4/1983 | United Kingdom . |
| 2144977 | 3/1985 | United Kingdom .......... 15/250.201 |
| 2 145 928 | 4/1985 | United Kingdom . |
| 2146891 | 5/1985 | United Kingdom .......... 15/250.201 |

*Primary Examiner*—Gary K. Graham
*Attorney, Agent, or Firm*—Morgan & Finnegan, LLP

[57] ABSTRACT

A motor vehicle screen wiper is of the type comprising a screen wiper blade having an articulated structure which carries, by means of a set of gripping elements, a wiping strip of flexible material. It also includes a flexible aerodynamic deflector mounted on the blade. The deflector includes at least one fastening lug which is fitted on to a gripping element of the articulated structure of the blade.

8 Claims, 2 Drawing Sheets

SCREEN WIPER BLADE HAVING A FLEXIBLE DEFLECTOR FASTENED ON THE GRIPPERS WHICH HOLD THE WIPING STRIP OF THE BLADE

FIELD OF THE INVENTION

This invention relates to screen wipers having a flexible deflector which is fixed on the fastening grippers by which the wiping strip of the screen wiper blade is held in place.

More particularly, the invention relates to a motor vehicle screen wiper of the type comprising a screen wiper blade having an articulated structure. The screen wiper is deformable in a longitudinal plane at right angles to a glass to be swept by the screen wiper (referred to in this application as the swept surface). The articulated structure carries a wiping strip of flexible material by means of a set of gripping elements (or grippers) arranged at each of its terminal ends. The articulated structure urges the wiping strip against the swept surface thereby causing the wiping strip to hug the contour, e.g. a curved contour, of the swept surface, the wiper further including a flexible aerodynamic deflector mounted on the wiper blade.

BACKGROUND OF THE INVENTION

An aerodynamic deflector for a screen wiper blade firstly enables an aerodynamic force to be applied such as to tend to urge the blade against the swept surface when the vehicle is travelling at high speed. Secondly, it prevents eddies of air which flow along the swept surface from disturbing the contact of the wiping strip against the glass, which would be detrimental to good wiping performance.

For this purpose it is necessary that the deflector be situated as close as possible to the wiping strip, and therefore as close as possible to the swept surface. Since the curvature of the swept surface may be very pronounced, especially in the case of a front windshield of a motor vehicle, and since the wiping strip is arranged to follow this curvature, it has become important to try to find a way of making the aerodynamic deflector of a flexible material in order that it is able to follow the deformations of the wiping strip, and therefore the contour of the windshield.

Thus, it has been proposed to provide a flexible deflector which is mounted on the articulated structure of the screen wiper blade, and which includes control fingers which are in engagement on an upper back portion of the wiping strip. This transmits to the deflector the deformations of the wiping strip. However, this arrangement proves to be very complex, because it also necessitates the provision of points of attachment of the deflector on the articulated structure which enable the deflector to slide vertically with respect to the articulated structure. Moreover, the control fingers which control the deformations of the deflector, and which are in uni-directional engagement on the wiping strip, are unable to cause the deflector to return to its relaxed or normal configuration.

It is therefore necessary to rely on the elasticity of the material of which the deflector is made, in order to return it to its initial configuration. This implies that the deflector itself exerts at any instant a parasitic force on the wiping strip, which tends to increase its contact pressure against the swept surface at the centre of the wiper blade, at the expense of the wiping pressure at the ends of the latter.

DISCUSSION OF THE INVENTION

An object of the invention is to overcome the above mentioned drawbacks.

According to the invention, a motor vehicle screen wiper, of the type comprising a screen wiper blade having an articulated structure which is deformable in a longitudinal plane at right angles to a swept surface. The articulated structure carries a wiping strip of flexible material by means of a set of gripping elements disposed at each of its terminal ends. The articulated structure urges the wiping strip against the swept surface so that the wiping strip follows the contours of the latter. The screen wiper is further of the type that includes a flexible aerodynamic deflector mounted on the blade. The deflector is characterised in that the deflector includes at least one fastening lug which is attached on a gripper of the articulated structure of the blade.

According to a preferred feature of the invention, the fastening lug embraces the gripping element elastically, so as to be immobilised against straight line movement with respect to the gripping element.

According to another preferred feature of the invention, the gripping element includes a transverse back portion in engagement against an upper surface of a gripping head of the wiping strip. The gripping element further including an upper or flange portion parallel to its transverse back portion and joined to the latter through a central foot, the fastening lug comprising a fastening flange. The fastening flange has a thickness which is substantially equal to the spacing between the back portion and the flange portion of the corresponding gripping element. The fastening flange of the fastening lug has a central opening, with a slot of reduced width joining the opening to a transverse edge of the fastening flange. The fastening flange is inserted longitudinally between the back portion and the transverse flange portion of the corresponding gripping element, the central foot of the gripping element being received in the central opening of the fastening flange, through the slot of reduced width, whereby the fastening lug is immobilised on the gripping element.

The flange portion of the fastening lug is preferably joined to a lateral face of the flexible deflector through a connecting portion of the fastening lug.

The fastening lug is preferably integral with the flexible deflector.

The fastening lug may be made of a rigid plastics material, with the flexible deflector being formed by moulding over the lug.

The flexible deflector preferably has a plurality of fastening lugs, each of which is attached to a corresponding gripping element of the screen wiper blade. The number of the said fastening lugs may then be equal to the number of the gripping elements of the screen wiper blade.

Further features and advantages of the invention will appear more clearly on a reading of the detailed description of a preferred embodiment of the invention, which is given below by way of example only and with reference to the accompanying drawings.

DESCRIPTION OF A PREFERRED EMBODIMENT OF THE INVENTION

Figure 1:
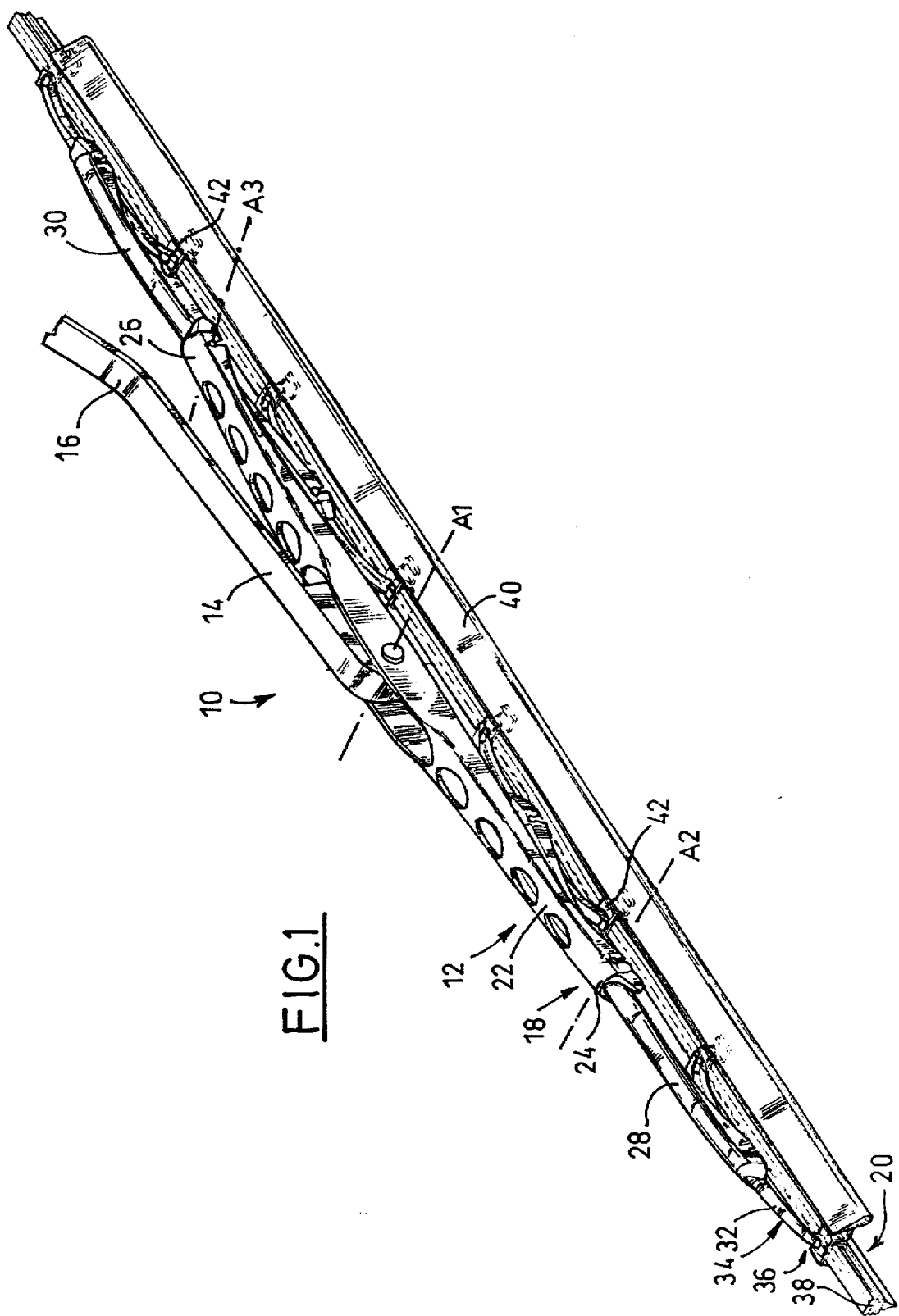
FIG. 1 is a perspective view of a screen wiper in accordance with the present invention.

FIG. 1 shows a motor vehicle screen wiper 10 comprising a screen wiper blade 12 which is articulated about a transverse axis A1 on the longitudinal front end 14 of an armor wiper 16 which drives the screen wiper 10 in back-and-forth wiping motion.

In a manner known per se, the screen wiper blade 12 includes an articulated structure 18 which lies in a longitudinal plane substantially at right angles to the general plane of a glass surface to be swept (not shown). The articulated structure 18 carries a wiping strip 20, and urges the latter against the swept surface. For this purpose, the articulated structure 18 comprises a main yoke 22 which is articulated on the front end 14 of the arm 16. Secondary yokes 28 and 30 are articulated on the longitudinal ends 24 and 26 respectively of the main yoke 22, about respective transverse axes A2 and A3. In their turn, the secondary yokes 28 and 30 carry articulated swingle bars 32 at each of the longitudinal ends of the secondary yokes.

Each articulated swingle bar 32 has, at each of its two longitudinal ends 34 (FIG. 2), a gripping element, or gripper, 36. The grippers 36 secure the wiping strip 20 to the structure 18 by cooperation with a head portion 38 (FIG. 3), of generally T-shaped cross section, of the wiping strip 20.

The screen wiper blade 12, constructed in this way, is a very long blade, which therefore comprises the main yoke 22, two secondary yokes 28 and 30, and four swingle bars 32; it therefore has eight grippers 36 for holding the wiping strip 20. It goes without saying that, if the screen wiper blade 12 is made in a shorter length, it is possible to reduce the number of gripping elements 36, for example by omitting one of the swingle bars 32, or even one of the secondary yokes 28 or 30.

The screen wiper blade 12 is provided with a flexible aerodynamic deflector 40 which extends longitudinally of the blade, to one side of the wiping strip 20. This deflector 40 has a set of fastening lugs 42, each of which is attached to a respective one of the gripping elements 36 of the articulated structure 18 of the blade 12.

Figure 2:
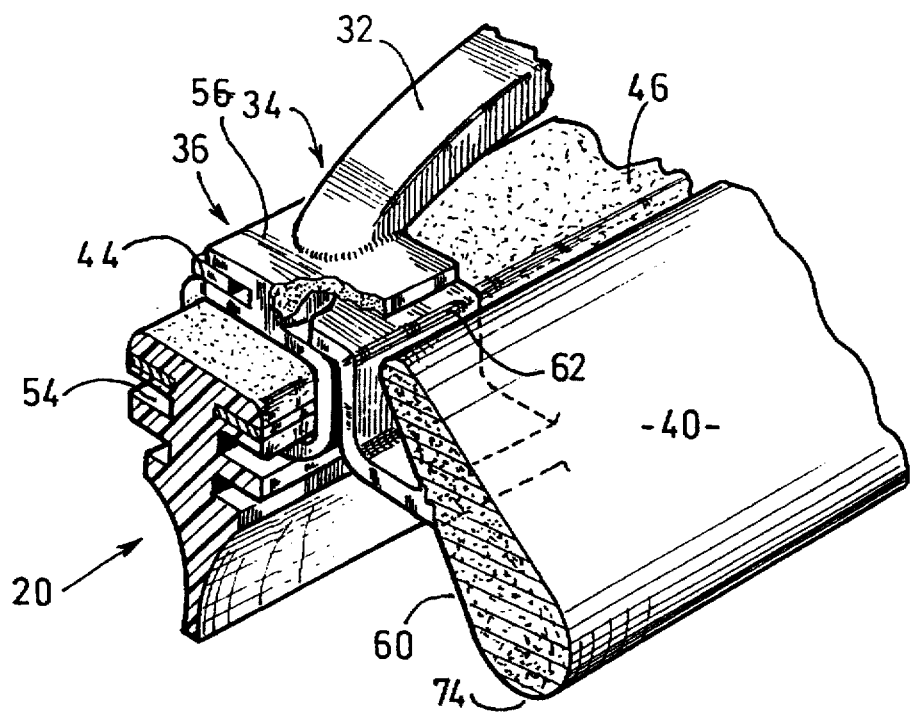
FIG. 2 is an enlarged detail of FIG. 1, which shows more particularly how a fastening lug is attached on a gripping element of a screen wiper in accordance with the invention.
Figure 3:
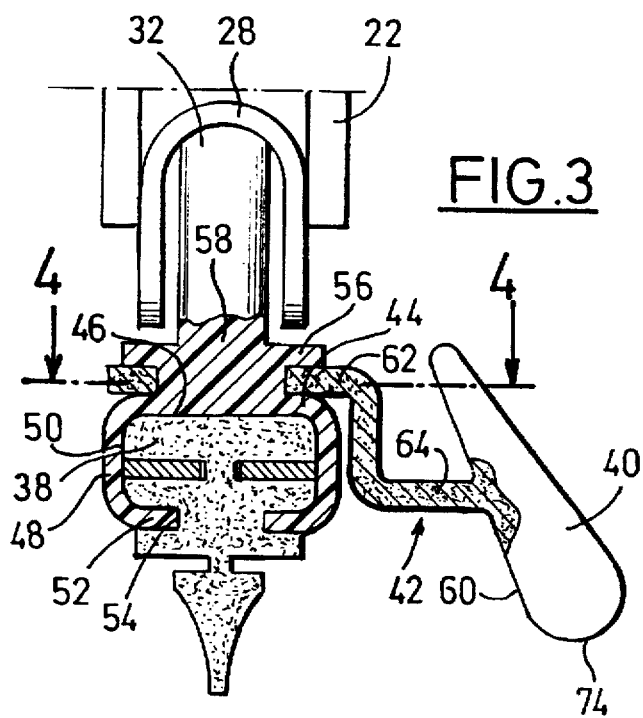
FIG. 3 is a view, partly in cross section in a transverse plane, showing the attachment of a fastening lug on a gripping element according to the invention.
Figure 4:
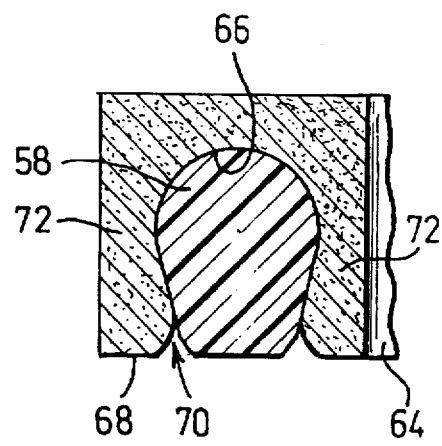
FIG. 4 is a view in cross section taken on the line 4—4 in FIG. 3, FIG. 4 being on a larger scale.

FIGS. 2 to 4 show in greater detail the assembly of a fastening lug 42 of the deflector 40 on a gripping element 36 of the blade 12. As can be seen best in FIG. 3, each gripper 36 of the articulated structure 18 has, in a manner known per se, a transversely extending first upper or back portion 44 which bears against an upper surface 46 of the T-shaped head 38 of the wiping strip 20. Two lateral leg portions 48 extend from the upper portion 44 towards the swept surface, across side faces 50 of the wiping strip head 38. Each of these leg portions 48 has an inwardly bent lower or free end portion 52 which is received in a longitudinal groove 54, the latter being formed for this purpose in each of the side faces 50 of the wiping strip head 38.

Means (not shown) are also provided for preventing longitudinal movement of the wiping strip 20 with respect to the grippers 36, thus completing the attachment of the wiping strip 20 on the articulated structure 18.

The grippers 36 also have a transverse upper flange portion 56 which is disposed parallel to, but above, the upper or back portion 44 of the gripper 36. The flange portion 56 is joined to the back portion 44 through a central foot 58 of the gripper.

The fastening lugs 42 of the flexible aerodynamic deflector 40 project inwardly from a lateral surface 60 of the deflector, which faces towards the remainder of the wiper blade 12, and in particular towards the wiping strip 20. Each fastening lug 42 consists of a fastening flange 62 which is arranged to cooperate with a respective one of the gripping elements 36, together with a connecting portion 64 which joins the fastening flange 62 to the body of the deflector 40. The fastening flange 62 is adapted to be inserted longitudinally between the upper or back portion 44 and the flange portion 56 of the gripper 36. For this purpose it is formed with a central opening 66 (FIG.4), which is open in a front transverse edge 68, through a slot 70 of reduced width. The fastening flange 62 thus has two longitudinal arms 72 which are defined on each side of the central, horseshoe-shaped opening 66. As can be seen in FIG. 4, the profile of this central opening 66 is complementary to that of the central foot 58 of the gripper 36.

As a result of this, the fastening flange 62 is able to be engaged, longitudinally towards the front, that is to say from right to left with reference to FIG. 2, between the upper or back portion 44 and the flange portion 56 of the gripper 36, around the central foot 58 of the latter. Because the transverse width of the slot 70 is smaller than that of the central foot 58, it is chamfered as shown in FIG. 4, while the central foot 58 has a rear face which is of such a form that, when the fastening flange 62 is engaged by means of its transverse front edge 68, the central foot 58 causes the two arms 72 of the flange 62 to be displaced apart elastically.

When the foot 58 is engaged with the base of the opening 66, the two arms 72 relax elastically back to their initial form, thus locking the fastening lug 42 on to the foot 58. This, in particular, prevents any rotation of the flange 62 with respect to the gripper 36 about the general axis of the foot 58. In addition, the fastening flange 62 has a thickness which is substantially equal to the spacing between the back portion 44 and the flange portion 56 of the gripper 36, so that the fastening lug 42 is thereby immobilised with respect to the associated gripper 36.

Thus, the deflector 40, which in this case has the same number of fastening lugs 42 as there are grippers 36 on the articulated structure 18, is held firmly in place on the wiper blade. In addition, the fastening lugs 42 not only provide fixing of the deflector on the wiper blade, but they also control deformation of the deflector. Accordingly, the deformation of the deflector in operation mimics that of the wiping strip 20, which follows the curved contour of the swept surface. Thus, because this deformation is accordingly controlled in a very precise manner, it is possible to position the lower edge 74 of the aerodynamic deflector 40 very close to the swept surface, so protecting very effectively the working edge of the wiping strip 20. This in turn leads to more nearly perfect wiping of the swept surface.

The fastening lugs 42 are preferably made integral with the deflector 40, as shown in FIG. 3. However, in a modified embodiment, it can be arranged that the fastening lugs 42 are made of a rigid material, with the aerodynamic deflector 40 being formed by moulding on to the lugs 42. The deflector can then be made in a different material, preferably one having a very low density.

What is claimed is:

1. A screen wiper for wiping a contoured swept surface of a motor vehicle, the screen wiper comprising an elongated, articulated structure, said structure defining a longitudinal direction, the structure being deformable by relative movement of at least two components in a direction perpendicular relative to the elongation thereof, a swingle bar having at least two terminal ends and being part of said structure, a set of grippers coupled to a respective one of each of the swingle bar terminal ends; an elongated wiping strip of flexible material received within and engaged by said grippers and defining, with said structure, a plane, the structure urging the swingle bar and thus the wiping strip against the swept surface to enable the wiping strip to selectively deform in a direction perpendicular to the longitudinal direction; a flexible aerodynamic deflector; and fastening means mounting the deflector on the swingle bar, wherein said deflector is laterally spaced from said plane, and wherein the deflector includes at least one fastening lug with a slot therein elastically and directly engaging a corresponding one of the grippers to establish the fastening means.

2. A screen wiper according to claim 1, wherein the at least one fastening lug is clipped elastically on to the corresponding gripper, the fastening lug and gripper immobilizing the lug against straight line movement with respect to the gripper.

3. A screen wiper according to claim 1, wherein the at least one fastening lug is integral with the deflector.

4. A screen wiper according to claim 1, wherein the at least one fastening lug is of a rigid plastics material, the flexible deflector being molded on to the lug.

5. A screen wiper according to claim 1, in which the deflector has a plurality of fastening lugs, each attached to a respective gripper.

6. A screen wiper according to claim 5, wherein the fastening lugs are equal in number to the grippers.

7. A screen wiper for wiping a contoured swept surface of a motor vehicle the screen wiper comprising a structure with opposed terminal ends, the structure being deformable in longitudinal direction relative to the wiper blade and at right angles to the structure, the structure including a set of grippers coupled to each of the structure terminal ends; a wiping strip of flexible material secured within said grippers, the structure urging the wiping strip against the swept surface to enable the wiping strip to selectively deform in a direction perpendicular to the longitudinal direction; a flexible aerodynamic deflector; and fastening means mounting the deflector on the structure wherein the deflector includes at least one fastening lug attached on a corresponding one of the grippers to establish the fastening means wherein each gripper has a first portion, the wiping strip having a wiping strip head defining a face thereof, the first portion of the gripper being in engagement against the face of the wiping strip head, the gripper further having a flange portion parallel to its first portion, and a central foot joining the flange portion to the first portion, to define a spacing between the flange portion and the first portion, the at least one fastening lug having a fastening flange with a thickness substantially equal to the spacing, the fastening flange having a transverse edge defining a slot, and being formed with central opening with a further opening in the edge through the slot, the slot being of reduced width with respect to the central opening, the fastening flange being received longitudinally between the first portion and the flange portion of the gripper, with the central foot of the gripper being received through the slot and within the opening of the fastening flange, whereby the fastening lug is immobilized on the gripper.

8. A screen wiper according to claim 7, wherein the deflector has a lateral surface facing towards the wiping strip, the at least one fastening lug further including a connecting portion joining the deflector lateral surface to the fastening flange of the lug.

* * * * *